United States Patent [19]

Pelletier

[11] 4,139,964
[45] Feb. 20, 1979

[54] FISHING LURES

[76] Inventor: Léon Pelletier, Rue Evariste Galois, Béziers, France

[21] Appl. No.: 786,806

[22] Filed: Apr. 12, 1977

[30] Foreign Application Priority Data

Apr. 13, 1976 [FR] France .............................. 76 11509

[51] Int. Cl.² .............................................. A01K 85/00
[52] U.S. Cl. ................................................. 43/42.19
[58] Field of Search ................... 43/42.19, 42.2, 42.21, 43/42.12

[56] References Cited

U.S. PATENT DOCUMENTS

| 613,519 | 11/1898 | Junod | 43/42.19 |
|---|---|---|---|
| 1,967,089 | 7/1934 | Hick | 43/42.19 |
| 2,162,845 | 6/1939 | Jones | 43/42.19 |
| 2,493,431 | 1/1950 | Wold | 43/42.2 |
| 2,804,713 | 9/1957 | Johnson | 43/42.19 |
| 3,439,443 | 4/1969 | Weimer | 43/42.2 |
| 3,648,397 | 3/1972 | DuBois | 43/42.1 R |

FOREIGN PATENT DOCUMENTS 544157  7/1957  Canada .................................. 43/42.19

Primary Examiner—Harold D. Whitehead
Attorney, Agent, or Firm—Karl F. Ross

[57] ABSTRACT

A lure has an element rotatably mounted in proximity to the lure hook structure on the monofilament and includes an off-center portion 8, able to create a resistance when a traction is exerted on the monofilament, thereby causing its transverse displacement with respect to the latter.

3 Claims, 6 Drawing Figures

FISHING LURES

The object of the present invention is to provide improved fishing lures.

Frequently, instead of baits consisting, for example, of a dead fish, a lure constituted, for example, of a synthetic-material fish is utilized having the appearance of a live fish.

The lure is generally attached at one end of the monofilament, the other extremity of which is attached to a fishing rod or a fishing reel with which the fishing rod is equipped.

When the fisherman exerts traction on the monofilament, the lure is axially displaced, thereby conveying the impression to large fish that it is a small live fish and provoking their attack. The inconvenience of the existing lures is that their movements are relatively limited since they only move normally in the direction imposed upon them by the monofilament.

In order to increase the variety of movements, certain lures are equipped with a flap causing them to move when a traction is imparted to the line by a slight movement of the scull.

However the known lures are only able to imitate imperfectly the movements of live fish.

The present invention overcomes these drawbacks.

To this effect, the lure of the invention has an element pivotally mounted in proximity of each lure on the monofilament, said element being able to rotate around the monofilament when traction is exerted on the same or when it is held against the stream flow, and having with respect to the monofilament an off-centered portion able to create a resistance when a traction is exerted on the monofilament, thereby causing its transverse displacement with respect to the latter.

The lateral displacement of part of the lure with respect to the line, combined with the pivoting of the element around the line, causes a displacement of the lure in volutes greater or lesser amplitudes depending on the traction speed of the line. This element can be placed at any location near the lure even so as to touch it.

Its most logical emplacement is in front or behind the lure in proximity to the same, so that the latter can benefit to the utmost from the movements imparted by the element.

This element, consisting of any kind of material, such as wood, iron or synthetic material, can be shaped, for example, as a right cone or an oblique cone and can be fitted on the monofilament to which the lure is attached either along an axis passing through the center of its base surfaces or an axis which does not pass through at least one center of one of its base surfaces.

In this case, the means for rotating the element are constituted by small vanes uniformly distributed on its periphery, said vanes being either affixed to or formed from open shutters on this surface.

This element can also have a helicoidal shape, its extremities having coaxial apertures for the passage of the monofilament.

The off-center portion can, as the case may be, either consist of part of the so-called element or of an affixed deflector assembly, off-center with respect to the monofilament.

According to an advantageous embodiment of the invention, the element rotatably mounted on the monofilament is covered by an element, itself pivotally mounted on the monofilament, capable of rotating around the same with a speed different from that of the first element and able to periodically mask the same so as to deprive it from its motor element.

Because of the presence of the deflector and its discontinuous movement, the element pivotally mounted on the monofilment has unrestrained movements, thereby attracting attention of and provoking attack by the fish.

IN THE DRAWING

Figure 1:
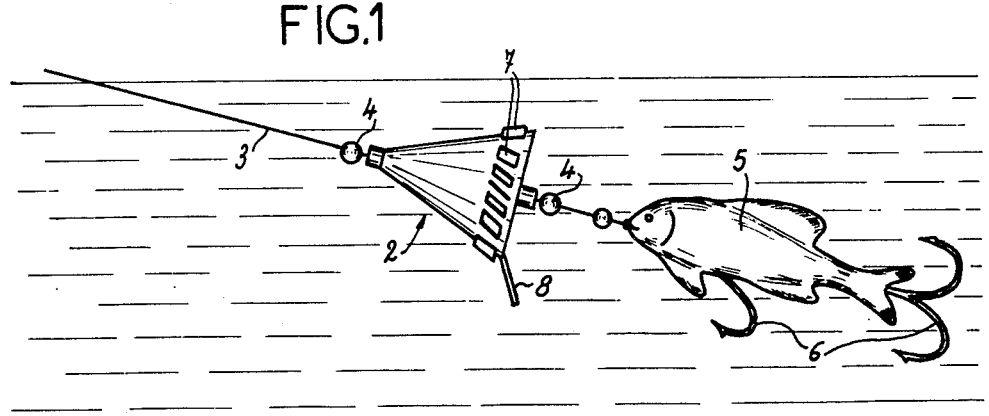
FIGS. 1 and 2 are perspective views of two elements each of which is associated to a lure in the condition of use.

The element 2 represented in FIG. 1 is in the form of an upright cone. It is fitted on the monofilament 3 passing through the center of its base surfaces. This element rotates freely around the monofilament 3 but is blocked in translation by stop means 4.

This element 2 is mounted on the monofilament 3 at the proximity of a bait 5 equipped with a fishhook 6.

The element 2 is mounted on the monofilament 3 in a manner such that its small base is on the side toward the fishing rod or reel and its large base toward the free end of the line.

In the proximity of its large base, the element 2 is equipped with small vanes 7 for rotating the element around the monofilament 3 when traction is exerted on the latter.

In the proximity of its large base, this element 2 is also equipped with a deflector 8 having no revolution symmetry with respect to the monofilament.

Figure 3:
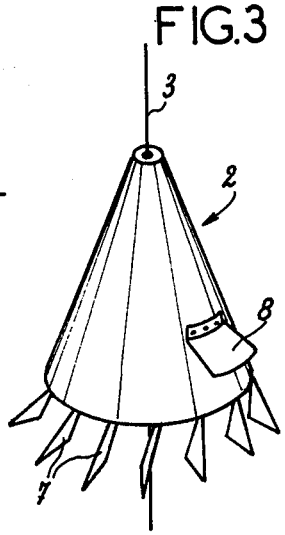
FIGS. 3 and 4 are two perspective views of modified embodiments of the element of FIG. 1.
Figure 4:
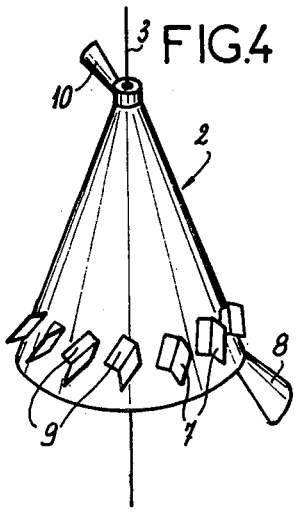

FIGS. 3 and 4 represent two modifications of this element 2.

In the embodiment represented in FIG. 3, the small vanes 7 are affixed at the extremity corresponding to the large base of the element 2.

In the embodiment shown in FIG. 4, the small vanes are in the form of shutters formed unitarily on the surface of the element itself, thereby providing the same with apertures 9 forming as many escape channels for the water streams repelled by the small vanes 7.

The element 2 represented in FIG. 4 is provided, apart from a deflector 8, with a second deflector 10, mounted on the side of its small base.

Figure 2:
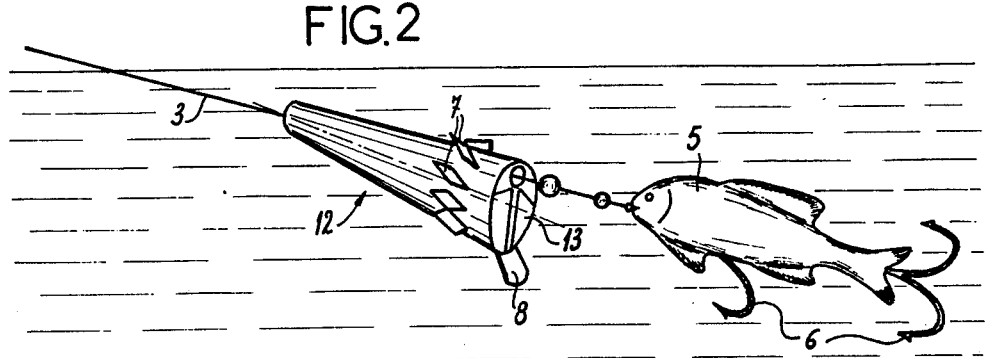

FIG. 2 represents an assembly equipped with an element 12, having an oblique conical surface. As the element 2, this element 12 is equipped with small vanes 7 and a deflector 8.

It is to be noted that element 12 is not fitted on the monofilament 3 by an axis passing through the center of its bases, the monofilament, as is evident from FIG. 2, traversing the base 13 of the element 12 in the vicinity of its edge.

This permits to increase the range of movements generated by the element.

Figure 5:
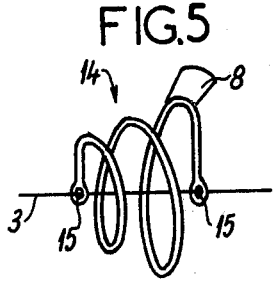
FIG. 5 is a perspective view of another element.

FIG. 5 represents an element 14 constituted of a wire of helicoidal configuration the extremities of which have coaxial lugs 15 for the passage of the monofilament 3. This element 14 also has a deflector 8.

It is to be noted in the case of element 12, that it is not indispensable to provide a deflector 8, the simple displacement of a portion of the element with respect to the monofilament allowing its transverse disequilibrium.

Figure 6:
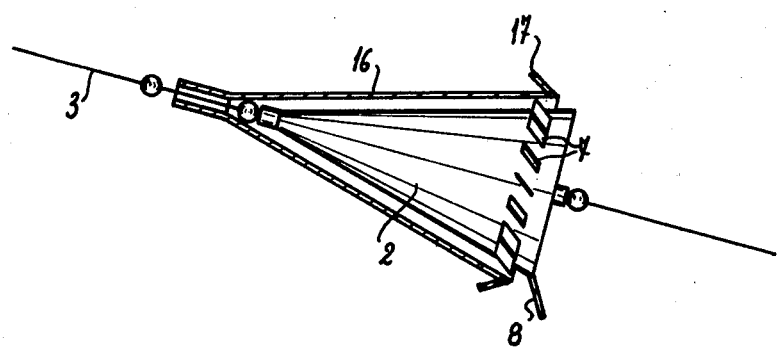
FIG. 6 is a view partially in section of a modification of the element of FIG. 1.

FIG. 6 shows an embodiment in which an element 2, such as has been shown in FIG. 1, is rotatable on a monofilament 3. An element 16 is likewise mounted on monofilament 3, rotating freely and independent of element 2, having the same shape as element 2 and being able to cover the same on the major part of its surface. The element 16 is provided on its periphery and with respect to the small vanes 7, with small vanes 17 constituted by opened shutters on its surface. The distribution of these shutters 17 differs from the one of the shutters 7 so that the element 16 turns around the monofilament 3 at a speed differing from that of element 2. Moreover, in the embodiment shown in the drawing the small vanes 17 have an opposite inclination from that of the vanes of element 2, so that the elements 2 and 16 rotate in the reverse order.

The unit being in the water, when it experiences the action of the stream or when a traction is exerted on the monofilament 3, the element 16 pivots around the same, the apertures provided by the vanes 17 let pass streams of water which rotatingly drive the element 2. Since the apertures in the element 16 do not correspond to the ones in the element 2, the latter is driven periodically, the assembly, when the element 2 is not pivoting, following the direction previously acquired and imparted by the deflector 8 which, for its part, continues to act, since it is not masked by the element 16.

It is obvious that the element, according to the invention, can assume a multiplicity of shapes, that is to say, it can have the form of a cone, a truncated cone, a pyramid, a truncated or ordinary cylinder, a part of a sphere, or other, the essential being that it is equipped by means securing its pivoting around the monofilament 3 and by means securing its transverse disequilibrium.

Likewise it is possible to imagine variations of the embodiment of FIG. 6; it suffices in effect to associate to the principal element a cover suited, during its rotation, to bring before the vanes or blades of said element a means which momentarily suppresses the effect of rotation generated by the sliding of the water over its vanes.

I claim:

1. A fish lure adapted to be drawn through the water by a fishing line, comprising:
   a bait formed with at least one hook and affixed to said line;
   a first element rotatable about said line and disposed ahead of said bait, said first element diverging toward said bait and being formed along its periphery with an array of vanes effecting rotation of said element upon the relative movement of said line and the water;
   a second element rotatable on said line and at least partly surrounding the vanes on said first element, said second element being provided with formations engaging the water to effect rotation of said second element relative to said first element and said line upon the relative movement of said lure and the water; and
   at least one asymmetrically disposed member connected to one of said elements for deflecting the lure from a straight line path through water.

2. The lure defined in claim 1 wherein both of said elements are generally conical and are provided with respective such members, said second element being formed with openings directing water to the vanes of said first element.

3. The lure defined in claim 2 wherein said second element is formed with vanes adjacent said openings and inclined oppositely to the vane of said first element whereby said elements rotate in opposite senses as said lure is drawn through the water.

* * * * *